United States Patent Office 3,579,608
Patented May 18, 1971

3,579,608
WIRE COATING OF BROMINATED DIGLYCIDYL ETHER OF BISPHENOL A AND POLYVINYL CHLORIDE
John B. De Coste, Basking Ridge, N.J., assignor to Bell Telephone Laboratories, Incorporated, Murray Hill, N.J.
Filed Aug. 26, 1968, Ser. No. 755,124
Int. Cl. C08g 45/04
U.S. Cl. 260—837          4 Claims

ABSTRACT OF THE DISCLOSURE

An abrasion resistant, insulating wire coating comprises plasticized vinyl chloride and a brominated bisphenol epoxy resin.

---

This invention relates to a coating for electrical conductors. More specifically, the present invention relates to an abrasion resistant insulating coating for electrical conductors comprising a plasticized poly(vinyl chloride) and a brominated bisphenol epoxy resin.

Insulated electrical conductors, such as those employed in telephony applications, are often subjected to outdoor use or conditions under which the insulator is exposed to the deteriorating influences of light, weather or abrasion. In the case of telephone drop wire, the familiar black overhead wire which brings telephone service to the home, it has been customary to employ extruded rubber insulation covered by a cotton serving jacketed with a neoprene compound of tire tread-like qualities for protective purposes. Although such protective coatings have been in widespread use for many years and have proven satisfactory from most standpoints, workers in the art have continually sought to develop alternatives.

Figure 1:
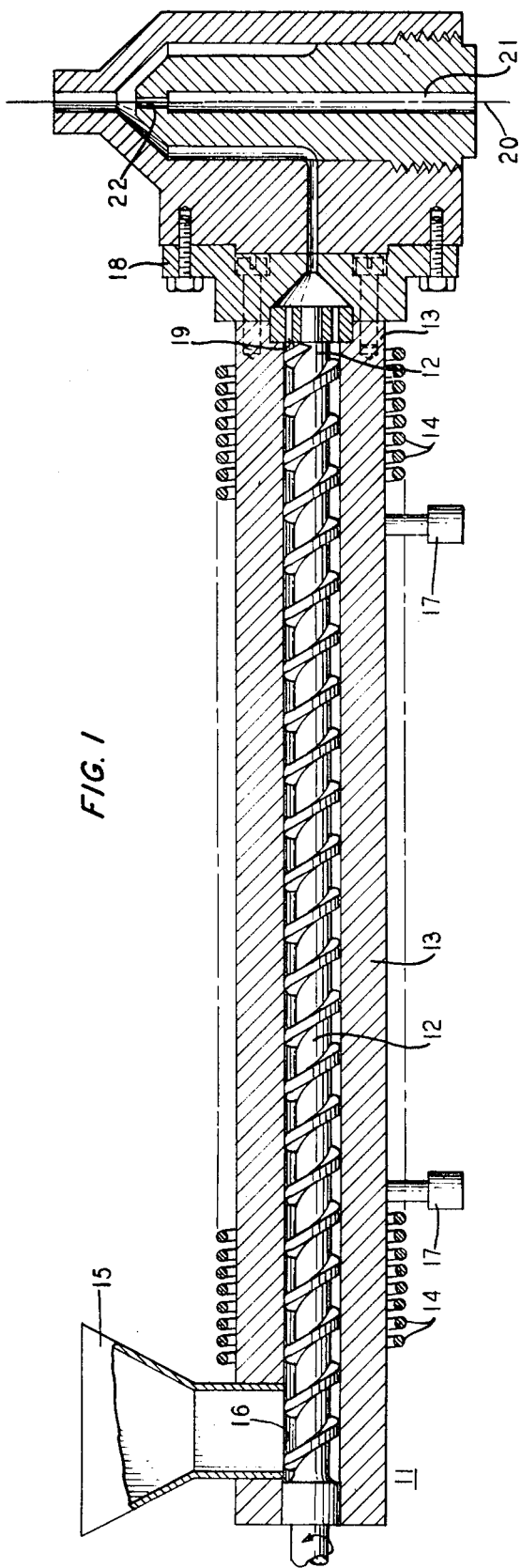
Figure 2:

In accordance with the present invention, this end has been attained by the development of a novel abrasion resistant insulating coating which can be obtained more economically than the conventional material. The inventive coating comprises a plasticized poly(vinyl chloride) in combination with a brominated bisphenol epoxy resin. It has been found that compositions of the described type manifest superior abrasion resistant properties and adhere directly to the surface of a heated conductor, thereby eliminating a prior art process step involving the application of a suitable adhesive to the conductor surfaces prior to extrusion. The invention will be more readily understood by reference to the following description taken in conjunction with the accompanying drawing wherein:

FIG. 1 is a cross-sectional view of an extruder including a typical wire covering cross head die suitable for the practice of the invention; and FIG. 2 is a front elevational view partly in section of a conductor coated with the coating of the invention.

With reference now more particularly to FIG. 1, there is shown a cross-sectional view of an apparatus suitable for use in the practice of the present invention.

Shown in the figure is an extruder 11 having a forwarding screw 12 rotatably mounted in barrel 13, heated by means of electrical resistance heaters 14. The barrel of the extruder is fitted with a tangentially fitted feed port 16 situated at the base thereof, thermocouples 17 and a typical wire covering cross head die 18. Die 18 is fitted with a breaker plate 19, which is placed between the end of screw 12 and die 18 in order to assist in the build-up of a pressure gradient along the length of the screw. The screw 12 may be driven by any suitable means, for example, an electric motor not shown. Also shown in die 18 is wire 20, wire guide 21, and wire guide core tube 22.

In the operation of the process for preparing vinyl chloride plastics in accordance with the invention, the poly(vinyl chloride) admixed with a brominated bisphenol epoxy resin and other conventional compounding ingredients is fed into the extruder through hopper 15 and feed port 16. Screw 12 driven by suitable means takes the mixture of polymer and bisphenol resin from the feed port through barrel 13, which is heated by means of electrical resistance heaters 14. During this period, the mixture is formed into intimate and substantially sliding contact with the hot barrel walls and is also sheared and worked whereby frictional effects are produced. The combined effects of the heated barrel and the heat due to internal friction in the material cause the thermoplastic mass to be molten by the time it has travelled approximately one-fourth of the distance of the extruder barrel, so assuring that it may be forced through the restriction to the extrusion die where it is given the desired form. The molten thermoplastic material is forced through the breaker plate assembly 19 and is then conducted to the wire guide core tube 22, which is shaped so that the composition flows around either side of it and joins again on the side remote from the supply. The complete annulus of material then flows toward the die orifice and ultimately contacts the wire. In this manner, a tube of plastic material is deposited over the wire which moves continuously through the cross head and acts as an internal forming mandrel, the wire being heated to a temperature within the range of 200–250° C. prior to entering the cross head die. It has been found that heating the wire to temperatures less than 200° C. results in weak bonding of the coating to the wire, whereas temperatures in excess of 250° C. adversely affect the properties of the plastic composition.

The poly(vinyl chloride) resins employed in the practice of the present invention are obtained from commercial sources and are of the type specified by GP6–0003–ASTM–D1755 (American Society of Testing Materials Standards, Part 26, June 1967). The properties of the high molecular weight poly(vinyl chloride) resins employed herein are such as to render them of interest for the purpose of the present invention, such resins evidencing excellent weather, water and fire resistance.

The brominated bisphenol resins employed in the practice of the present invention are the diglycidyl ethers of brominated Bisphenol A obtained by reacting epichlorohydrin with Bisphenol A and sodium hydroxide in the presence of bromine. The desired brominated bisphenol epoxy resin evidences a bromine content from 18–48 percent and an epoxy equivalent ranging from 200–520, such ranges being dictated by practical considerations.

In the operation of the process, for the preparation of poly(vinyl chloride) resins in accordance with the invention, it has been found that from 5.0–10.0 parts, by weight, of brominated bisphenol epoxy resin per 100 parts, by weight, of poly(vinyl chloride) are required, the maximum being dictated by practical considerations and the minimum by considerations relating to the adhesive properties of the material.

A general outline of the methods herein described and the ranges of operating parameters will now be given.

In the practice of the invention, a premixed composition comprising poly(vinyl chloride) and brominated bisphenol epoxy resin is charged directly to the feed hopper of an extruder of the type shown in FIG. 1.

The composition is next admitted to the barrel of the extruder which has been preheated to a temperature slightly above the softening point of the polymers, typically from 175 to 210° C., wherein it is thoroughly worked and fed therealong by means of the screw. Temperatures may vary from the softening point of the materials to the decomposition temperature thereof, so permitting wide latitude in the selection of operating conditions. Further, the process is independent of residence time and practical considerations dictate selection of specific temperatures.

After travelling approximately one-fourth of the distance of barrel 13, the mixture becomes molten. The molten mixture then continues through the barrel and proceeds towards the breaker plate which restricts its flow and creates a back pressure.

As the composition passes through the breaker plate, it is led to the wire covering cross head die and more specifically, to the wire guide core tube 22, which is shaped so that the composition flows around either side of it and joins again on the side remote from the supply. The complete annulus of the material then flows toward the die orifice and ultimately contacts the heated wire. In this manner, a tube of plastic material is deposited over the wire which moves continuously through the die and acts as an internal forming mandrel.

Several examples in the practice of the present invention are set forth below in order to enable one skilled in the art to practice the invention.

EXAMPLE I 5.0 parts of an epichlorohydrin tetrabrominated Bisphenol A resin (epoxide equivalent 375, melting point—60° C., 48% bromine), obtained from commercial sources, 100 parts of a mixture, comprising 100 parts, by weight, of a poly(vinyl chloride) resin, GP6-00003-ASTM-D1755, 64.0 parts, by weight, of mixed N-octyl, n-decyl phthalate, 5.0 parts, by weight, of lead silicate sulfate, 37.0 parts, by weight, of calcium carbonate, 3.0 parts, by weight, of antimony oxide and 2.5 parts, by weight, of carbon black, were hot mixed on a differential two speed roller mill and formed into test specimens which were assembled between 3" x 6" x 0.030" solvent cleaned copper panels, an aluminum spacer being used in order to provide a free plastic tab at one end for testing.

Next, the copper panels were inserted in the frame mold of an electric press preheated to 230° C. and pressure applied to the panels for approximately two minutes. Thereafter, the mold was transferred to a water cooled press and the specimens removed when a temperature of 50° C. was reached.

The adhesion of the plastic to the copper was measured by peeling back the plastic at an angle of 180° to the base plate. In order to obtain a uniform stress on the plastic, the tab was clamped between maple blocks using a centrally placed "C" clamp. The testing load was measured with a spring scale having a capacity of 50 pounds. Weathering tests were conducted by progressively peeling about 0.5 inch sections from the panel. The peel strength was initially found to be greater than 50 (capable of withstanding greater than 50 pounds along a 3 inch line for one minute without peeling) and manifested the same peel strength after 6, 9, 12 and 15 months of outdoor weathering (New Jersey exposure, 45° facing south).

EXAMPLE II

The procedure of Example I was repeated with the exception that 9.4 parts by weight of tetrabrominated Bisphenol A resin were employed. Peel strengths were found to be greater than 50 originally and after the periods of weathering noted above in Example I.

EXAMPLE III

The mixtures prepared in accordance with the procedure described in Example I were charged to the hopper of a screw extender of the type shown in FIG. 1, the barrel having been preheated to a temperature ranging from about 180° C. near the hopper to 160° C. near the breaker plate. Thereafter, the molten mixture passed through the head and die of the extruder through which a pair of 19 gauge copper conductors (preheated to 230° C.) of 36 mils diameter was passed at varying speeds. The resultant coated conducter is shown in FIG. 2. Shown in the figure is copper conducter 31 surrounded by poly (vinyl chloride) protective covering 32. An adhesion value was obtained by measuring the force (applied parallel to the axis of the conductor) required to strip a ⅜" length of insulation as it is pulled through a die. This value was found to be 33 pounds.

What is claimed is:

1. An extrudable composition of matter consisting essentially of a plasticized poly(vinyl chloride) and from 5–10 parts, by weight, per 100 parts, by weight, of poly (vinyl chloride) of a polymerized diglycidyl ether of brominated Bisphenol A having a bromine content ranging from 18–48 percent and an epoxide equivalent ranging from 200–520.

2. Composition in accordance with claim 1 wherein said bisphenol is tetrabrominated Bisphenol A.

3. An abrasion resistant insulating extrudable wire coating consisting essentially of a plasticized poly(vinyl chloride) and from 5–10 parts, by weight, per 100 parts, by weight, of poly(vinyl chloride) of a polymerized diglycidyl ether of brominated Bisphenol A having a bromine content ranging from 18–48 percent and an epoxide equivalent ranging from 200–520.

4. Coating in accordance with claim 3 wherein said bisphenol is tetrabrominated Bisphenol A.

References Cited

UNITED STATES PATENTS

| | | | |
|---|---|---|---|
| 3,086,888 | 4/1963 | Stratton | 260—837 |
| 3,288,884 | 11/1966 | Sonnabend | 260—837 |
| 3,383,337 | 5/1968 | Garling | 260—837 |
| 3,444,122 | 5/1969 | Antlfinger | 260—837 |
| 3,385,908 | 5/1968 | Schwarzer | 260—837 |

OTHER REFERENCES

Handbook of Epoxy Resins, Lee et al., McGraw-Hill Book Co., New York, 1967 (publication date Mar. 21, 1967), pp. 4–64 and 4–41.

PAUL LIEBERMAN, Primary Examiner

U.S. Cl. X.R.

260—31.8, 37, 41, 836